(12) United States Patent
Bender et al.

(10) Patent No.: US 8,928,290 B2
(45) Date of Patent: Jan. 6, 2015

(54) ELECTRIC MOTOR DRIVES FOR RECAPTURING ELECTRICAL ENERGY

(71) Applicants: Gregory J. Bender, San Jose, CA (US); Steven H. Kuhn, San Jose, CA (US); David N. Kuhn, Piedmont, CA (US)

(72) Inventors: Gregory J. Bender, San Jose, CA (US); Steven H. Kuhn, San Jose, CA (US); David N. Kuhn, Piedmont, CA (US)

(*) Notice: Subject to any disclaimer, the term of this patent is extended or adjusted under 35 U.S.C. 154(b) by 46 days.

(21) Appl. No.: 13/591,601

(22) Filed: Sep. 25, 2012

(65) Prior Publication Data

US 2014/0084875 A1    Mar. 27, 2014

(51) Int. Cl.
*H01M 10/46* (2006.01)
*H02J 15/00* (2006.01)

(52) U.S. Cl.
CPC ..................... *H02J 15/00* (2013.01)
USPC ........................................... 320/166

(58) Field of Classification Search
USPC ................... 320/103, 104, 109, 166
See application file for complete search history.

(56) References Cited

U.S. PATENT DOCUMENTS

| | | | | |
|---|---|---|---|---|
| 4,374,347 A * | 2/1983 | Muller | ........................ | 318/400.3 |
| 6,664,750 B2 * | 12/2003 | Pelonis | ..................... | 318/400.29 |
| 7,868,569 B2 * | 1/2011 | Iwashita et al. | ............... | 318/376 |
| 2003/0127928 A1 * | 7/2003 | Bedini | ........................... | 310/103 |
| 2012/0038327 A1 * | 2/2012 | Yokoyama | ..................... | 320/166 |

* cited by examiner

*Primary Examiner* — Edward Tso
(74) *Attorney, Agent, or Firm* — Steven H. Kuhn, Esq.

(57) ABSTRACT

A set of electric motor drives for recapturing otherwise unused electrical energy from electric motors and methods of using same are disclosed that provide electrical energy in addition to mechanical energy by recapturing electrical energy that would be unused if conventional technologies were followed. Such recapturing motor drives can provide recaptured electrical energy to other loads, can transfer recaptured electrical energy to storage devices for future use, and/or can recirculate recaptured electrical energy back through a recapturing motor drive. By recapturing unused electrical energy, the recapturing motor drives enable significantly greater useful energy output for any given electrical energy input drawn from a power source as compared to conventional technologies, materially increasing the efficient use of electrical energy drawn from the power source and dramatically reducing the relative consumption of electrical energy drawn from the power source. The present invention also lowers component count, reducing design time and production costs.

63 Claims, 14 Drawing Sheets

Block Diagram of H-Bridge
Switch-Mode Motor Drive

All N-Channel Motor Drive

Pulse Width Modulation (PWM) control signal used in Switch-Mode Circuitry

Representative Block Diagram of a Switch Mode DC Motor Controller

Example of a Test Setup for Measuring Motor Drive Characteristics

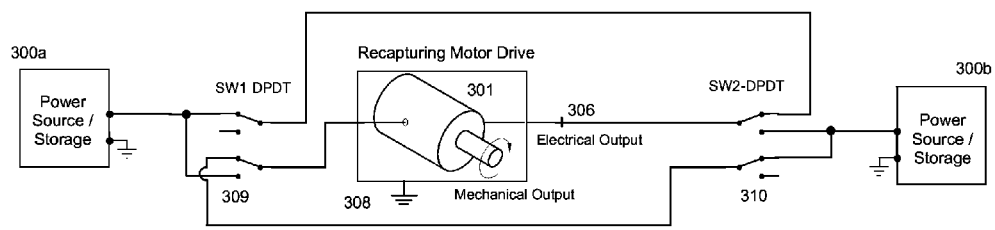
Bi-Directional Charging Relay Control System   Figure 3a.
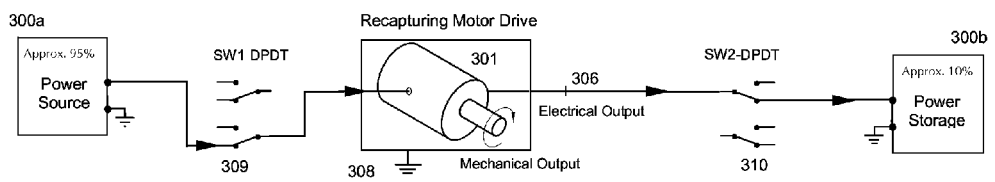
Forward Charging   Figure 3b.
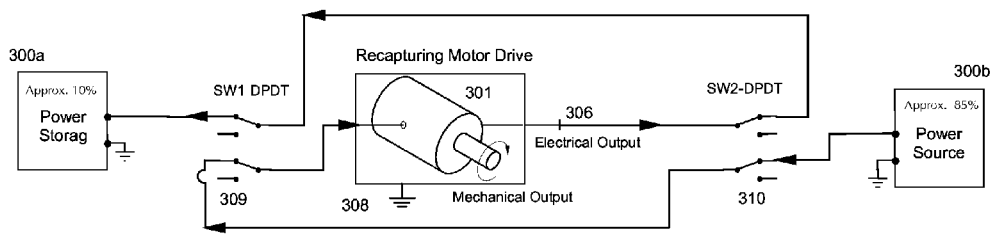
Reverse Charging   Figure 3c.

Recapturing Motor Drive with Auxiliary Switch-Mode Supply Output

Recapturing Motor Drive with Recirculating Switch-Mode Circuitry

Recapturing Motor Drive Module With Integrated Recirculating Switch-Mode Circuitry.

Serial Recirculating Configuration

Serial Recirculating Configuration Variants

Serial-Parallel Recirculating Configurations

Serial-Parallel Recirculating
Configuration Variants

Applied Automotive
Recirculating Drive System
With Dual Source Charging System

ELECTRIC MOTOR DRIVES FOR RECAPTURING ELECTRICAL ENERGY

FIELD OF THE INVENTION

The present invention relates to the field of electric motor drives and, more specifically, to techniques for recapturing otherwise unused electrical energy from driving electric motors, thereby greatly improving the overall efficiencies and effectiveness of power sources and electro-mechanical systems.

BACKGROUND

The current state of the art with respect to electric motor drives involves the use of a power source that provides electrical energy to switch-mode circuitry, most typically in the form of a half-bridge or a full H-bridge, that drives an electric motor using pulse width modulation control signals at a specified duty cycle and frequency controlling the speed and/or mechanical energy output of the electric motor.

An electric motor converts electrical energy into mechanical energy to drive a load. The current state of the art is the use of a power source to supply electrical energy to an electric motor to produce mechanical energy by using switch-mode circuitry with a switch-mode controller that regulates the pulse width modulation duty cycle of the electrical energy supplied to the electric motor. When the control signal for the switch-mode circuitry is in the "off" or inactive portion of the duty cycle, electrical energy that could be available is directed to ground or is otherwise unused. Therefore, what is needed in the art of electric motor drives is a way of recapturing the electrical energy that is unused during the "off" or inactive portion of the duty cycle.

The approaches described in this section are approaches that could be pursued but are not necessarily approaches that have been previously conceived or pursued. Therefore, unless otherwise indicated, it should not be assumed that any of the approaches described in this section qualifies as prior art merely by virtue of inclusion in this section.

SUMMARY

The present invention is comprised of a related set of electric motor drives for recapturing electrical energy from electric motors, and methods for using same, which, in addition to producing mechanical energy, recapture and utilize otherwise unused electrical energy. Such recapturing motor drives have an electrical energy output capable of providing electrical energy to any type of load. A number of exemplary embodiments of the present invention are provided for improving the overall energy output of an electric motor drive system by producing both mechanical energy and electrical energy through the use of pulse width modulation. Such exemplary embodiments are not in any way to be deemed restrictions or limitations on embodiments of the present invention.

BRIEF DESCRIPTION OF THE DRAWINGS

The present invention is illustrated by way of example, and not by way of limitation, in the figures of the accompanying drawings in which like reference numerals refer to similar elements and in which:

FIG. 3a depicts an embodiment of the present invention where multi-directional charging relay control circuitry is being used to transfer recaptured electrical energy to and from multiple power source/storage devices, thereby increasing electric motor drive system efficiency.

FIG. 3b depicts the active circuitry of the embodiment of the present invention depicted in FIG. 3a where the electric motor drive system is shown in forward-charging mode.

FIG. 3c depicts the active circuitry of the embodiment of the present invention depicted in FIG. 3a where the electric motor drive system is shown in reverse-charging mode.

Figure 7A:
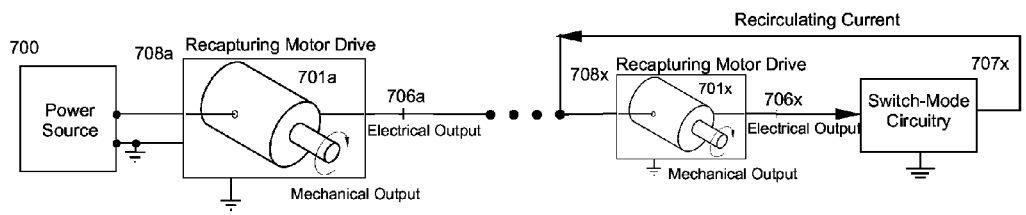
FIG. 7a depicts embodiments of the present invention where the electric motor drives are shown coupled in serial configurations and where the output of the final serial electric motor drive is shown coupled with switch-mode circuitry the output of which is coupled with the final serial electric motor drive, thereby recirculating recaptured electrical energy through the final serial electric motor drive.
Figure 7B:
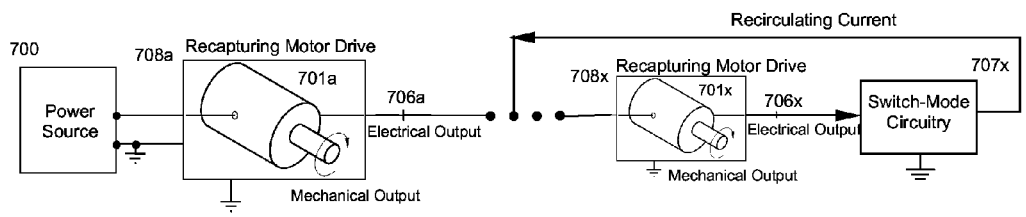
FIG. 7b depicts embodiments of the present invention where the electric motor drives are shown coupled in serial configurations and where the output of the final serial electric motor drive is shown coupled with switch-mode circuitry the output of which is coupled with any preceding serial electric motor drive, thereby recirculating recaptured electrical energy.

Components numbered 708*a-x* in FIG. 7*b* depict embodiments of the present invention where the components are coupled in serial configurations being used to provide electrical energy to each successive serial electric motor drive with each successive serial electric motor drive being smaller than the previous serial electric motor drive and where at least one serial electric motor drive recirculates recaptured electrical energy (707*x*) to at least one preceding serial electric motor drive.

Figure 8:
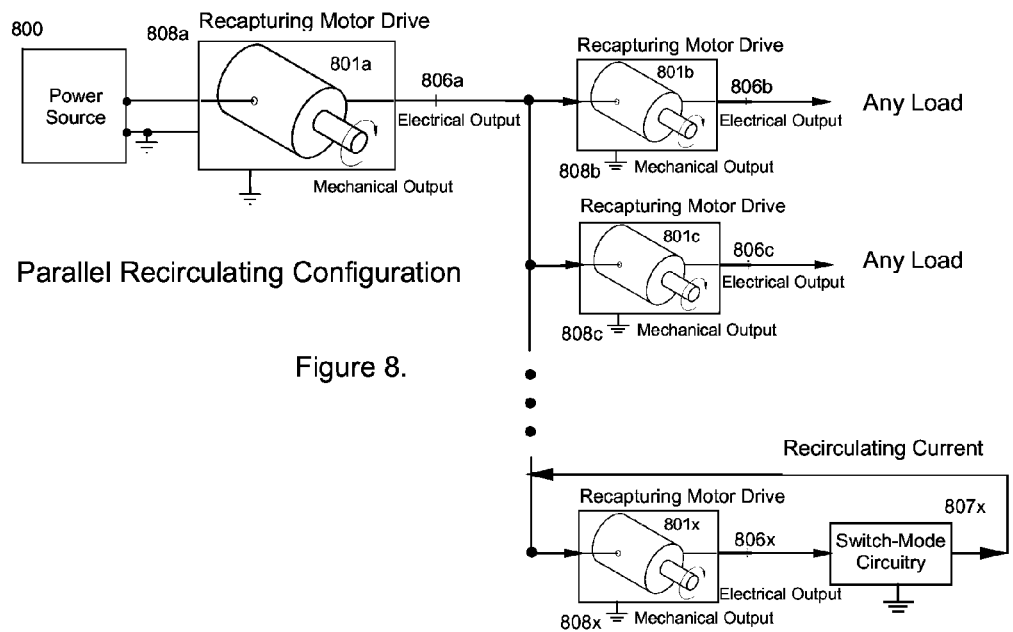

FIG. 8 depicts embodiments of the present invention where the electric motor drives are shown coupled in parallel and serial configurations being used tp provide recaptured electrical energy to multiple mechanical and electrical loads where at least one electric motor drive is coupled with switch-mode circuitry the output of which is coupled with a preceding electric motor drive, thereby recirculating recaptured electrical energy.

Figure 9A:
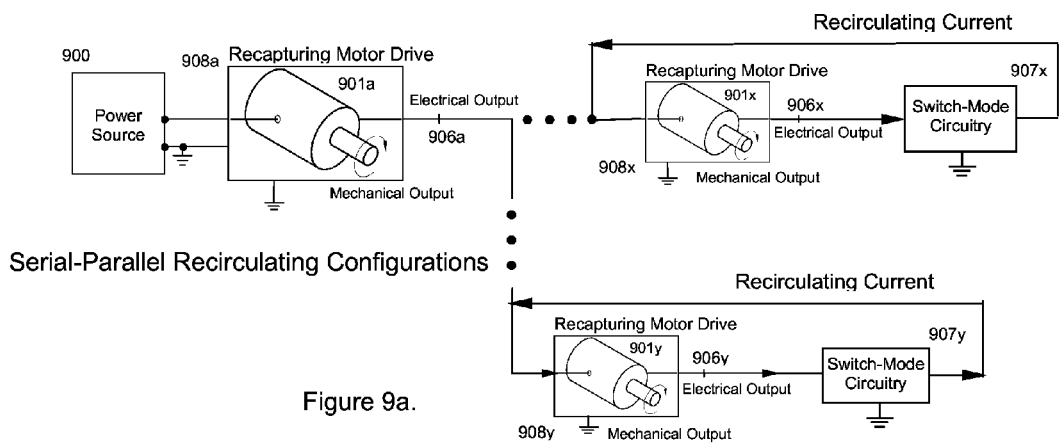

FIG. 9*a* depicts embodiments of the present invention where recaptured electrical energy is being provided to multiple smaller electric motor drives each with recaptured electrical energy recirculation circuitry.

Figure 9B:
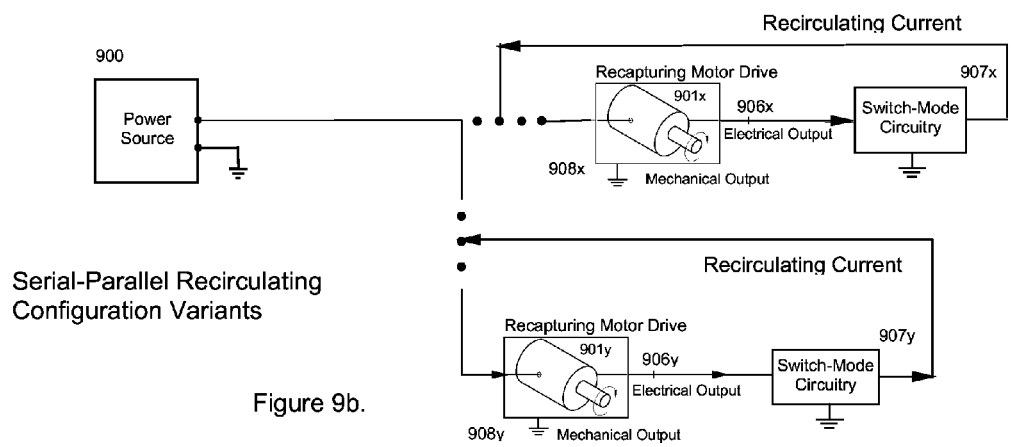

FIG. 9*b* depicts embodiments of the present invention where recaptured electrical energy is being provided to multiple electric motor drives each with recaptured electrical energy recirculation circuitry.

Figure 10:
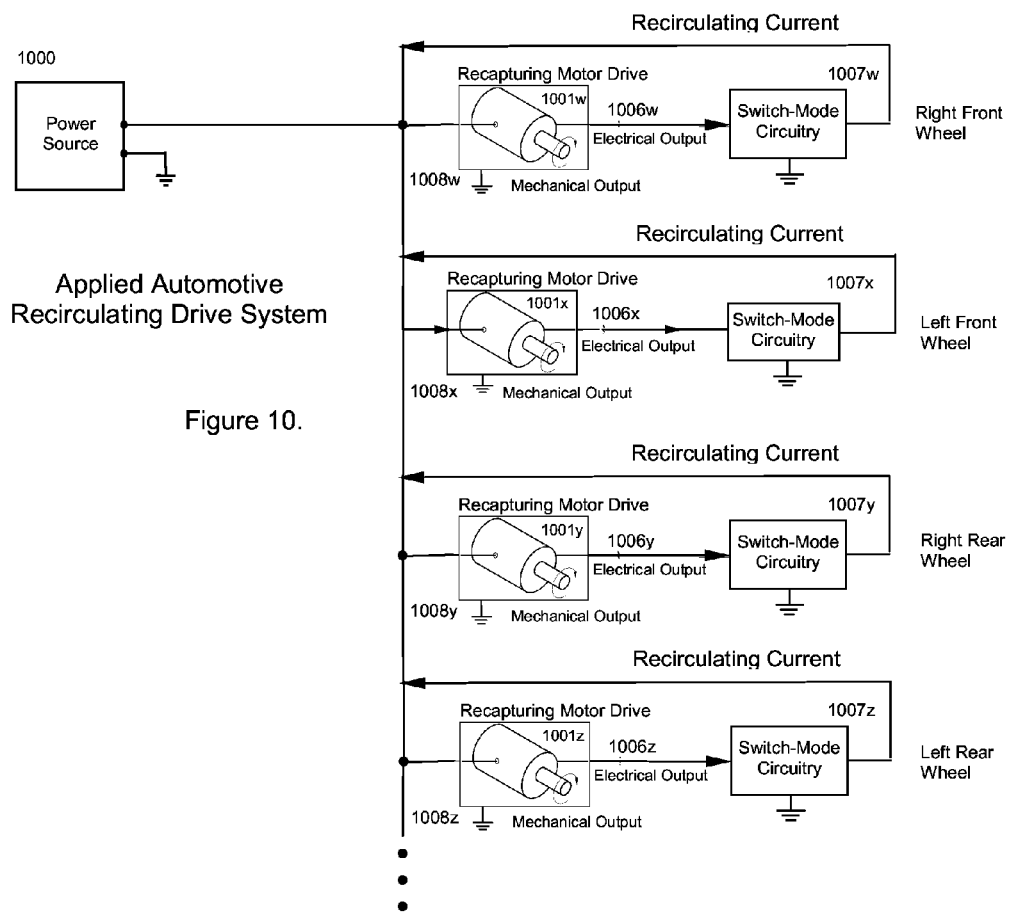

FIG. 10 depicts embodiments of the present invention where multiple electric motor drives each with recaptured electrical energy recirculation circuitry drive multiple electric motors in a highly efficient manner. In the figure shown, the electric motor drives could be used to drive the wheels of an electric vehicle.

Figure 11:
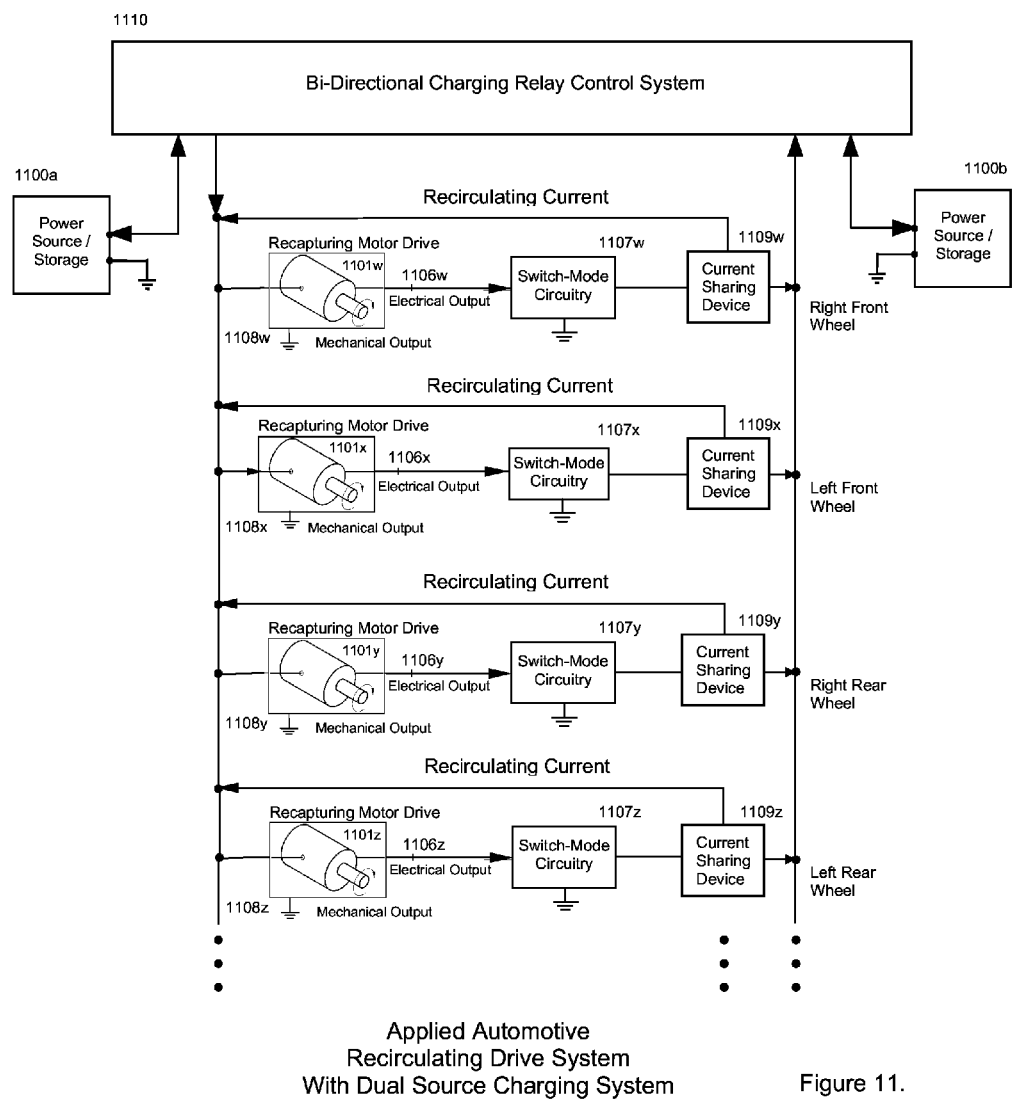

FIG. 11 depicts embodiments of the present invention where multiple electric motor drives are coupled with multiple power source/storage devices through current-sharing devices to a multi-directional charging relay control system. In the figure shown, the electric motor drives could be used to drive the wheels of an electric vehicle.

It should be noted that, based upon the foregoing depictions, it will be apparent that many applications and combinations of the present invention are possible once various configurations of the present invention have been disclosed.

DETAILED DESCRIPTION

For the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The present invention recaptures the electrical energy that is otherwise unused during the "off" or inactive portion of the pulse width modulation duty cycle that is driving an electric motor. Such recapture of otherwise unused electrical energy allows for a much more efficient and effective utilization of total electrical energy drawn from a power source. Such recapture of electrical energy will reduce materially the overall relative power consumption from a power source driving any platform using an electric motor.

In certain embodiments of the present invention, electrical energy that is otherwise unused is recaptured and recirculated back to an electric motor drive. Through the recapture and recirculation of such otherwise unused electrical energy, the application of the present invention will extend the potential efficiency of electric motor platforms to a heretofore unprecedented level.

Industrial and commercial electric motor drive applications of the present invention include, as examples and without limitation, the areas of public and private land (highway and rail), water, and air transportation, construction, HVAC, and aerospace and computer and any and all other technologies that have a limited power-budget or otherwise could benefit from reduced electrical energy consumption. Where the power source is a power source/storage device that contains a finite amount of stored electrical energy, as in the cases of batteries and fuel cell devices, the present invention will extend significantly the potential period of time over which such finite amount of electrical energy can be used before it is necessary to recharge. Practical applications of the present invention therefore would include, as examples and without limitation, devices such as portable computers and electric vehicles.

The present invention is best understood by reference to the figures wherein like depictions are designated with like numerals throughout.

Figure 1A:
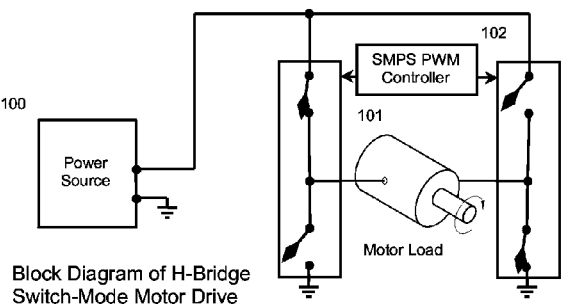
FIG. 1a depicts a typical prior art H-Bridge switch-mode electric motor drive controlling an electric motor load.
Figure 1B:
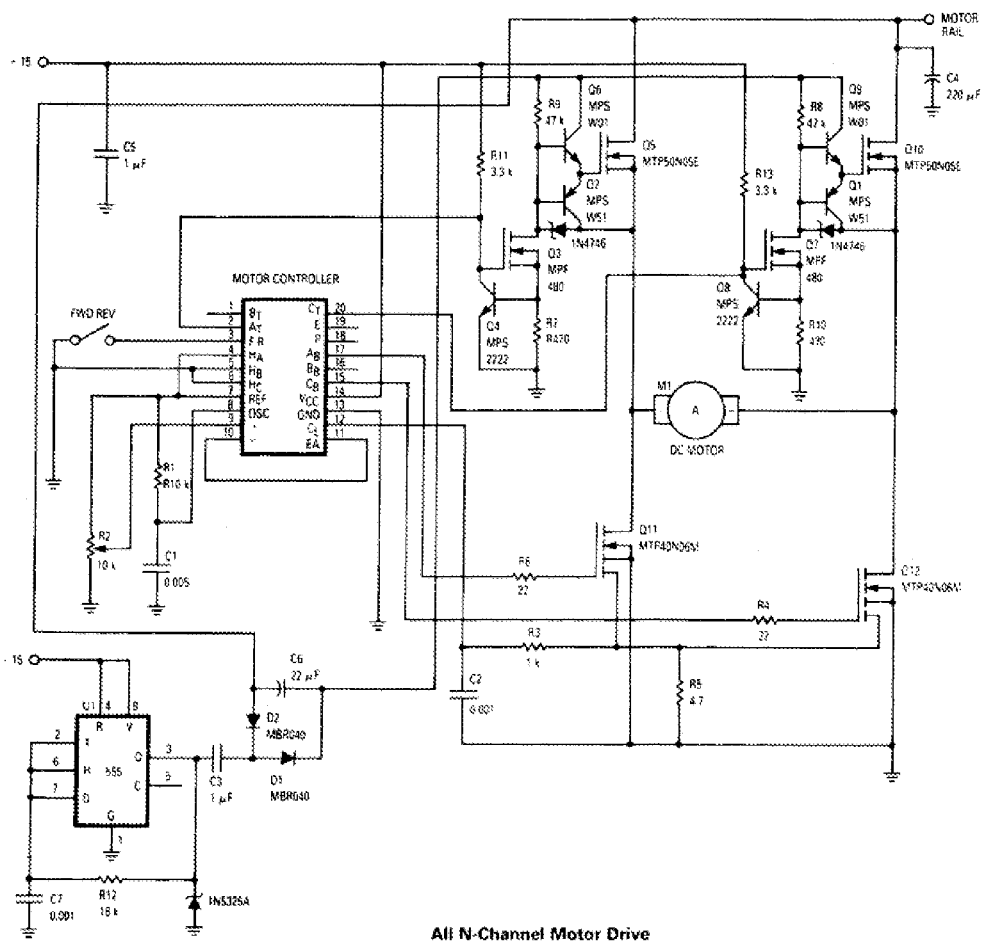
FIG. 1b depicts a representative schematic of a typical prior art H-Bridge switch-mode electric motor drive and its supporting components utilizing pulse width modulation to control the speed and direction of the electric motor.
Figure 1C:
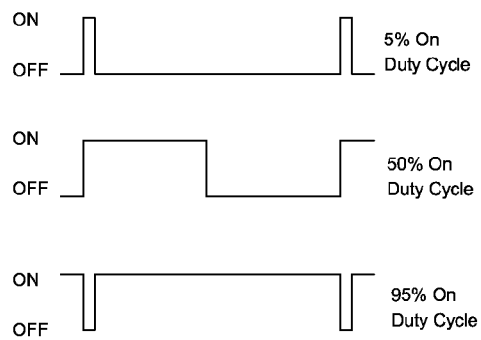
FIG. 1c illustrates typical pulse width modulation control signals used in standard switch-mode circuitry. Such pulse width modulation control signals are graphically illustrated over the typical range of a 5% to 95% duty cycle of total transferred electrical energy.
Figure 1D:
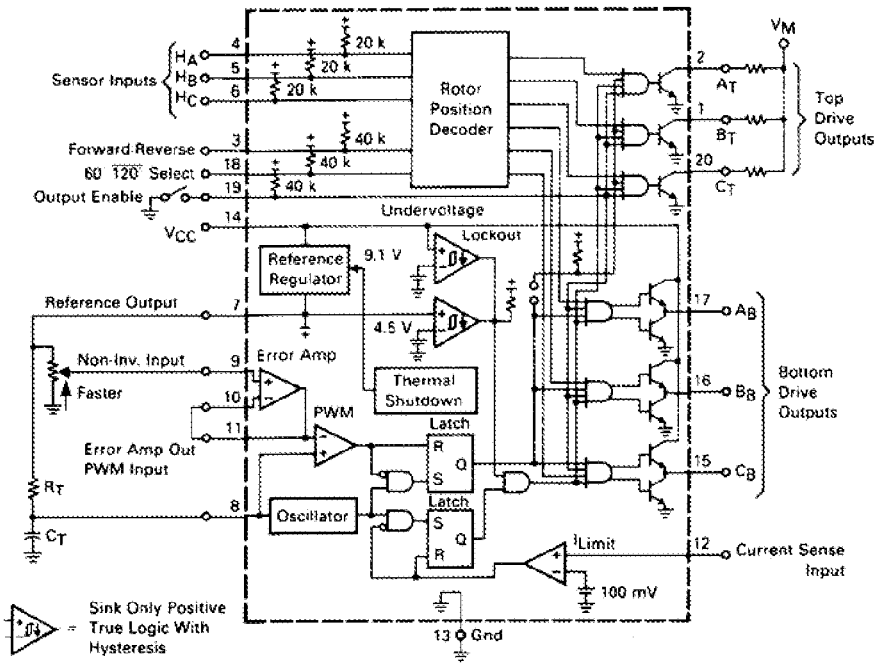
FIG. 1d depicts a typical prior art standard pulse width modulation signal control circuit used in switch-mode circuitry.
Figure 1E:
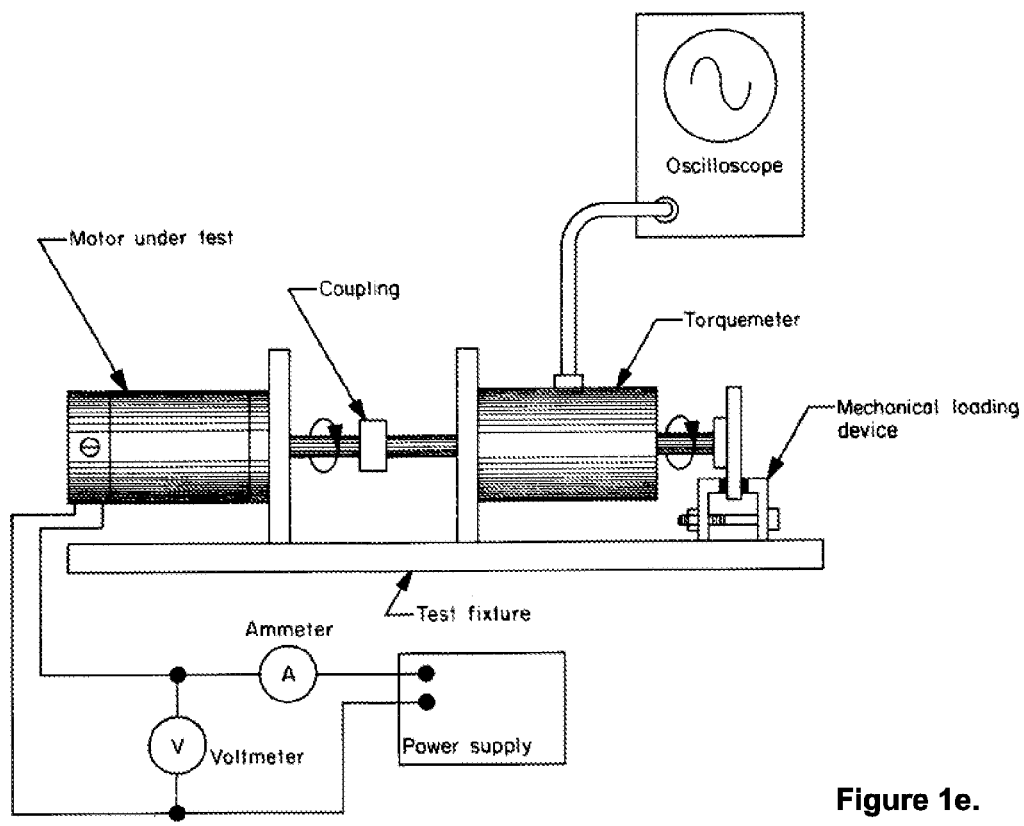
FIG. 1e illustrates a calibrated test set-up for measuring the performance of an electric motor drive over a wide range of repeatable conditions.

FIGS. 1*a*-1*d* show prior art in the field of electric motor drive design. FIG. 1*a* shows a block diagram of a typical H-bridge switch-mode electric motor drive, which is commonly used to drive an electric motor. FIG. 1*b* shows the internal circuitry of a typical H-bridge N-channel electric motor drive at a schematic level, using MOSFETs as switches. FIG. 1*c* shows typical control signals that are used for pulse width modulation. Included in the diagram are a 5% duty cycle, a 50% duty cycle, and a 95% duty cycle. These percentages directly correspond to the total transfer of electrical energy through any switch-mode circuit. FIG. 1*d* shows a representative block diagram of a typical switch-mode electric motor controller. FIG. 1*e* shows a prototypical calibrated test set-up for measuring electric motor drive characteristics over a wide range of repeatable conditions.

"Power source" refers to any device capable of supplying electrical energy as a source of electrical energy such as, but not limited to, any AC line power, generator, battery, solar cell, fuel cell device, or other device with electrical source characteristics that are commonly known in the art of electro-mechanics.

"Power source/storage" refers to any device capable of storing electrical energy and acting as a source of electrical energy such as, but not limited to, a battery or a capacitor or other device with electrical source and storage characteristics that are commonly known in the art of electro-mechanics.

"Terminal" refers to any mechanical contact that allows one or more electrical connections.

In order to measure with precision the performance of the electric motor drives under test (DUT), two precision-matched servo-motors may be used. These servo-motors are to be coupled directly with a geared timing belt. In addition, a belt tensioning system may be added which may be tuned to the anti-resonance of the motor mounts of the servo-motors, thereby reducing structural vibrations and increasing accuracy. In this test set-up, one servo-motor is the drive motor and the second servo-motor is used as a precise reference load for the first servo-motor. Shunt resistors are used to create Eddy current loads within the second servo-motor. In this manner, a range of many orders of magnitude, as well as both short and open circuits, provide precise measurements and calculations of the total transfer of energies throughout the entire system. This data can now be analyzed over a wide variety of parameters and load conditions. Thus, this test set-up may be used to verify the performance of electric motor drives such as the present invention.

The architectures of embodiments of the present invention enable significant practical improvements to electric motor drive systems. Most importantly, the present invention allows the applicable circuitry to make significantly more efficient and effective use of the available electrical energy because it recaptures electrical energy that would otherwise be unused. The present invention also lowers total part count resulting in reduced design time and production costs Reference is now made to FIGS. 2a-2d which depict various embodiments of the present invention.

Figure 2A:
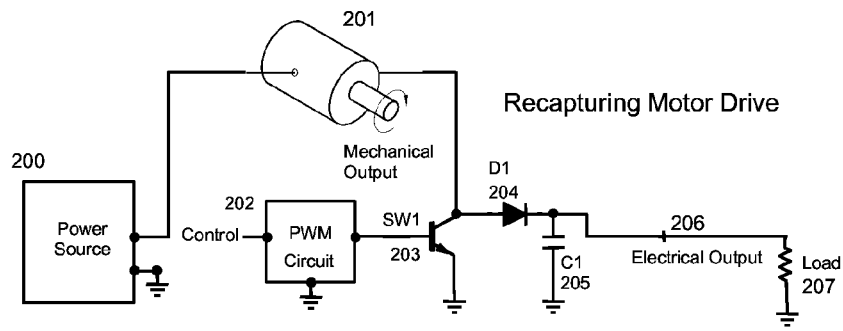
FIG. 2a depicts a representative schematic of an embodiment of the present invention.

FIG. 2a depicts an embodiment of the present invention with both mechanical and electrical outputs. FIG. 2a depicts a power source (200) coupled with an electric motor (201) coupled with a switch-mode control circuit comprising the pulse width modulation switch-mode controller (202), a switch (203), a diode (204), and a capacitor (205). These recapturing motor drive components, working in concert, produce both mechanical energy and an electrical energy output (206), the latter of which can drive any type of mechanical or electrical load.

Figure 2B:
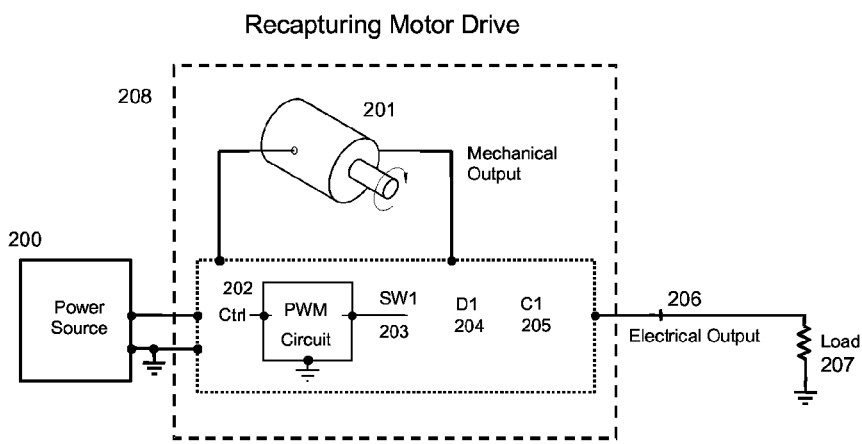
FIG. 2b depicts a representative abstraction of any combination of couplings of the components comprising the present invention.

FIG. 2b is a representative abstraction of any combination of couplings of the components comprising the present invention (208).

Figure 2C:
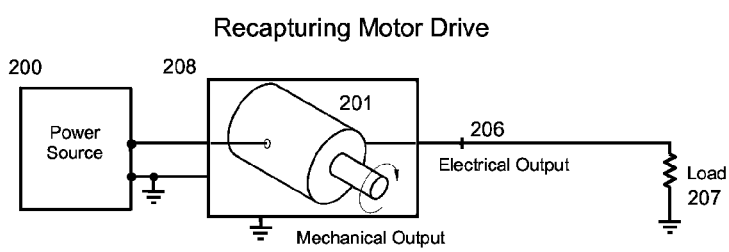
FIG. 2c depicts an easily recognized symbol of the representative abstraction depicted in FIG. 2b (208).

FIG. 2c depicts recapturing motor drive circuitry abstracted in FIG. 2b as a symbol. This symbol is used throughout the rest of this disclosure for clarity.

Figure 2D:
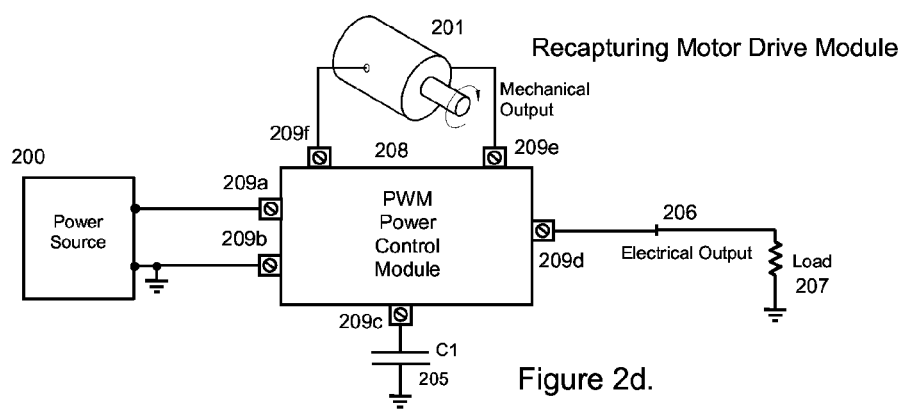
FIG. 2d depicts a modular application of embodiments of the present invention containing terminals.

FIG. 2d depicts the present invention in modular configurations with terminals where a power source (200) and an electric motor (201) and a capacitor (205) can be coupled with recapturing motor drive circuitry by use of connection terminals (209a-f). Such modular configurations allow for certain of the components of the recapturing motor drives to be integrated into modular applications for ease of sale and use. Moreover, such modular configurations allow for compact generic blocks to be readily customized for specific systems resulting in reductions in design time and production costs. It should be apparent in light of the foregoing that many different applications using the present invention can be made.

FIG. 3a depicts the present invention in configurations of a recapturing motor drive coupled with multiple power supply/storage devices (300a and 300b) through multi-directional charging relay control circuitry. In such configurations, electrical energy can be supplied to an electric motor by use of one power source/storage device and, at the same time, the recaptured electrical energy from the recapturing motor drive can be transferred to another power source/storage device or multiple power source/storage devices for future use. In this manner, the power source/storage devices can be discharged and charged alternately. For example, when, as shown, two power source/storage devices are utilized, one power source/storage device (300a) is supplying the power to an electric motor and thereby discharging and the second power source/storage device (300b) is being charged by the recaptured electrical energy directed to the electrical output of the recapturing motor drive.

FIG. 3b depicts the system of FIG. 3a with circuitry that is active in "forward charging" mode. In forward charging mode, the first power source/storage device (300a) is at approximately 95% of its fully-charged capacity and is supplying electrical energy to the recapturing motor drive. At the same time, the second power source/storage device (300b) is at approximately 10% of its fully-charged capacity and is being charged by the recapturing motor drive.

FIG. 3c depicts the circuitry of FIG. 3a operating in the opposite direction. When in such latter mode, it is referred to as "reverse charging" mode. In reverse charging mode, the second power source/storage device (300b) is charging the first power source/storage device (300a) through the same recapturing motor drive. The system can alternate between forward charging mode and reverse charging mode as necessary. Such cyclical alternation between or among power source/storage devices can extend the electrical/mechanical energy output of an electric motor significantly. The alternating cycles can be continued until each power source/storage device reaches approximately 20% of full charge, at which point the power source/storage devices can be used together as one power source so as to extend the last of the electrical energy stored in the system. Once this level of charge is reached, one of the power source/storage device(s) can be charged in a shorter time period and the overall discharge/recharge cycle can be repeated indefinitely. It should be apparent in light of the foregoing that many different applications using the present invention can be made.

Figure 4A:
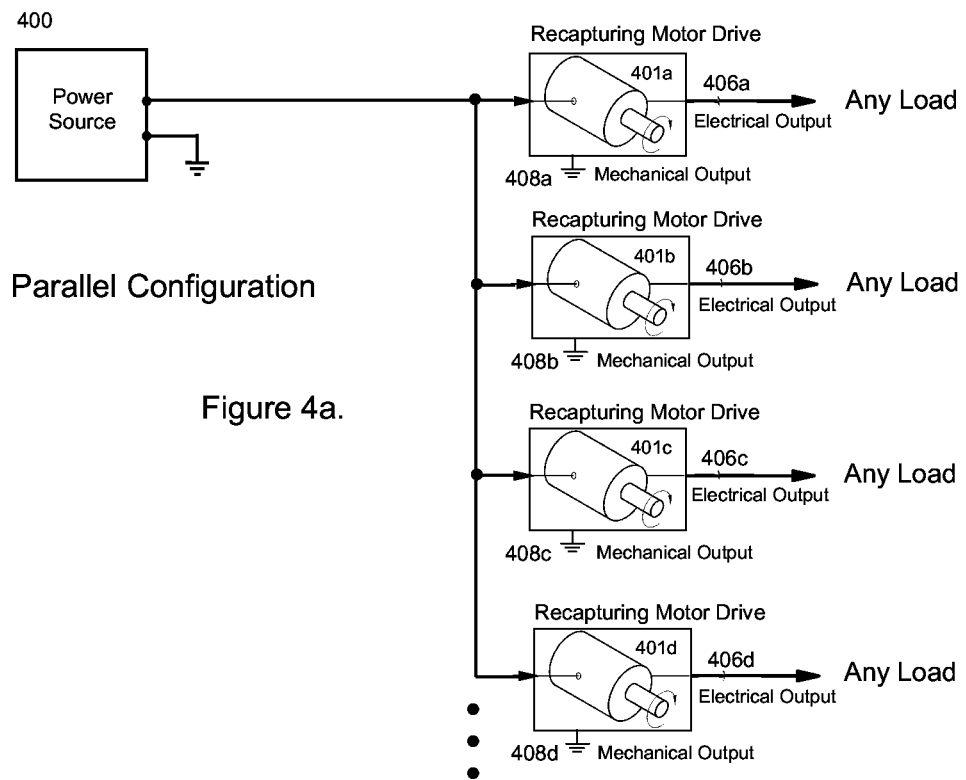
FIG. 4a depicts embodiments of the present invention where the electric motor drives are shown coupled in parallel configurations being used to provide recaptured electrical energy to multiple mechanical and electrical loads

FIG. 4a depicts the present invention in configurations of multiple recapturing motor drives coupled in parallel arrangements providing recaptured electrical energy to various electric loads. Electrical outputs (406a, 406b, 406c, and 406d) can be used to provide recaptured electrical energy to virtually any other electrical load within the power limits of the over-all system. Such electrical loads can be any load, including, without limitation, any power source/storage device or other switch-mode circuitry. It should be apparent in light of the foregoing that many different applications using the present invention can be made.

Figure 4B:
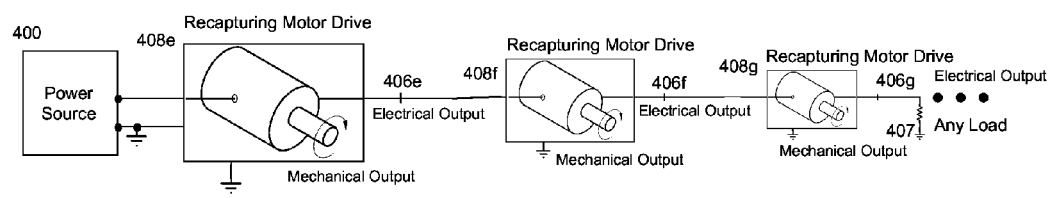
FIG. 4b depicts embodiments of the present invention where the electric motor drives are shown coupled in serial configurations being used to provide recaptured electrical energy to multiple mechanical and electrical loads.

FIG. 4b depicts the present invention in configurations of multiple recapturing motor drives coupled in serial arrangements providing recaptured electrical energy to each successive serial recapturing motor drive. In the present depiction, each serial recapturing motor drive is smaller than the preceding serial recapturing motor drive and these arrangements can be repeated until an application-dependent point of diminishing returns is reached.

Figure 5:
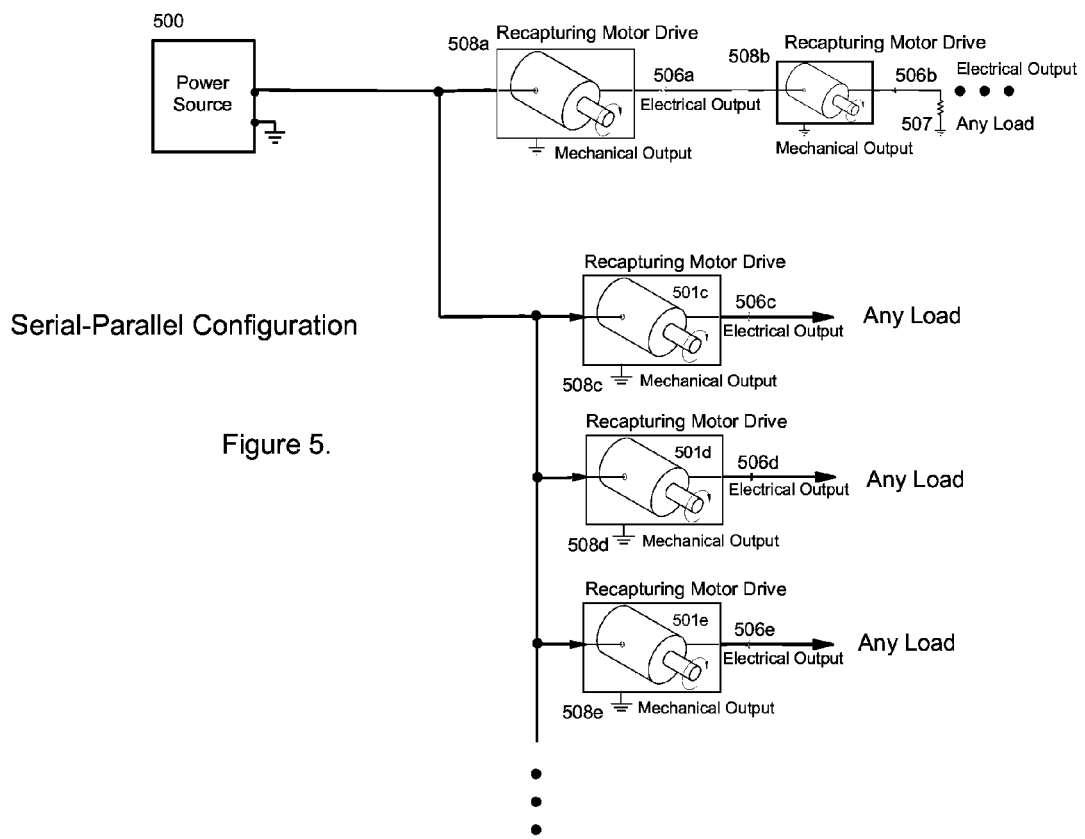
FIG. 5 depicts embodiments of the present invention where the electric motor drives are shown coupled in parallel and serial configurations being used to provide recaptured electrical energy to multiple mechanical and electrical loads.

FIG. 5 depicts the present invention in configurations of multiple recapturing motor drives (508a-e) coupled in serial and parallel arrangements providing recaptured electrical energy to a variety of loads, including, without limitation, power source/storage devices or other recapturing motor drives, accessories, and/or active loads such as additional switch-mode circuitry. It should be apparent in light of the foregoing that many different applications using the present invention can be made.

Figure 6A:
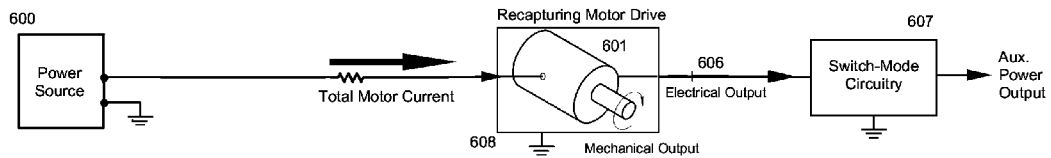
FIG. 6a depicts embodiments of the present invention where the electric motor drive is shown coupled with switch-mode circuitry.

FIG. 6a depicts the present invention in a configuration of a recapturing motor drive (608) coupled with additional switch-mode circuitry (607). This configuration can be used to adjust the output of the recapturing motor drive system to any desired voltage or current requirement.

Figure 6B:
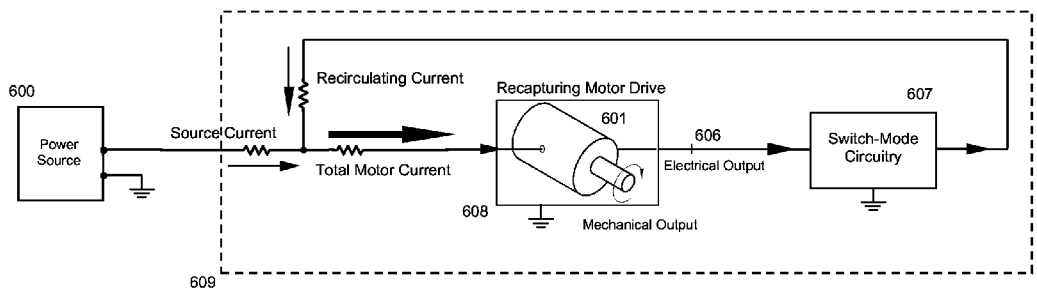
FIG. 6b depicts embodiments of the present invention where the electric motor drive is shown coupled with switch-mode circuitry the output of which is coupled with the electric motor drive, thereby recirculating recaptured electrical energy through the electric motor drive, requiring significantly less relative energy consumption from the power source.

FIG. 6b depicts the present invention in a configuration of a recapturing motor drive coupled with additional switch-mode circuitry where the output of the additional switch-mode circuitry is coupled with the recapturing motor drive for the purpose of recapturing and recirculating otherwise unused electrical energy back through the recapturing motor drive. It should be noted that the additional switch-mode circuitry should have a switching frequency that is much higher than the recapturing motor drive. This makes for efficient use of the "off" or inactive portion of the duty cycle, thereby allowing more efficient and effective use of electrical energy. It should be apparent in light of the foregoing that many different applications using the present invention can be made.

Figure 6C:
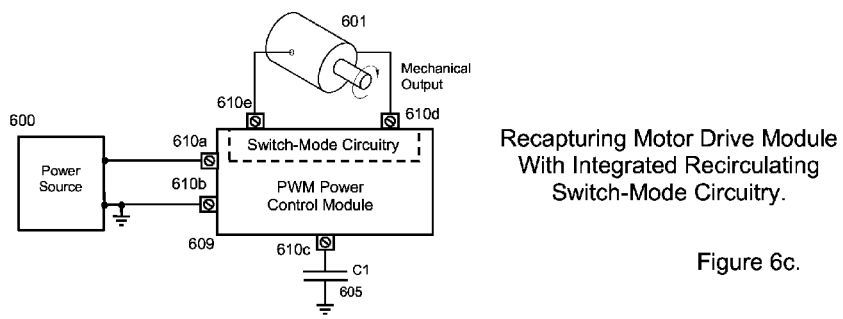
FIG. 6c depicts a modular application of embodiments of the present invention containing terminals.

FIG. 6c depicts the present invention in modular configurations with terminals where a power source (600) and an electric motor (601) and a capacitor (605) can be coupled with recapturing motor drive circuitry by use of connection terminals (609a-e). Such modular configurations allow for certain of the components of the recapturing motor drive to be integrated into modular applications for ease of sale and use. Moreover, such modular configurations allow for compact generic blocks to be readily customized for specific systems resulting in reductions in design time and production costs. It should be apparent in light of the foregoing that many different applications using the present invention can be made.

FIG. 7a depicts the present invention in configurations of multiple recapturing motor drives coupled in serial arrangements providing recaptured electrical energy to each successive serial recapturing motor drive where the final serial recapturing motor drive is recirculating recaptured electrical energy through the final serial recapturing motor drive. It should be apparent in light of the forgoing that many different serial applications using the present invention can be made.

FIG. 7b depicts the present invention in configurations of multiple recapturing motor drives coupled in serial arrangements providing recaptured electrical energy to each successive serial recapturing motor drive where the final serial recapturing motor drive is recirculating recaptured electrical energy through any preceding serial recapturing motor drive. It should be apparent in light of the foregoing that many different serial applications using the present invention can be made.

Components numbered 708a-x in FIG. 7b depict an embodiment of the present invention where the components are coupled in serial configuration providing recaptured electrical energy to each successive serial electric motor drive with each successive serial electric motor drive being smaller than the previous serial electric motor drive and with at least one serial electric motor drive recirculating recaptured electrical energy (707x), to at least one preceding serial electric motor drive.

FIG. 8 depicts the present invention in configurations of multiple recapturing motor drives (808a-x) coupled in parallel arrangements providing recaptured electrical energy to a variety of loads, including, without limitation, power source/storage devices, accessories, and at least one active load such as additional switch-mode circuitry for recirculating recaptured electrical energy through at least one recapturing motor drive. These types of configurations may include diode isolation techniques and/or current sharing devices for different performance requirements. It should be apparent in light of the foregoing that many different parallel applications using the present invention can be made.

FIGS. 9a and 9b depict the present invention in configurations of multiple recapturing motor drives (908a-y) coupled in serial and parallel arrangements providing recaptured electrical energy to power source/storage devices, thus extending the charge usage of the power source/storage devices. These types of configurations may include diode isolation techniques and/or current sharing devices for different performance requirements. It should be apparent in light of the foregoing that many different serial and parallel applications using the present invention can be made.

FIG. 10 depicts the present invention in configurations of multiple recapturing motor drives (1008w-z) coupled in parallel arrangements intended specifically for extending the range and performance of multiple wheel drive electric vehicles by recirculating recaptured electrical energy. These types of configurations may include diode isolation techniques and/or current sharing devices for different performance requirements. It should be apparent in light of the foregoing that many different parallel applications using the present invention can be made.

FIG. 11 depicts the present invention in configurations of multiple recapturing motor drives (1108w-z) coupled in parallel arrangements with multiple power source/storage devices (1100a and 1100b) where the arrangements are intended specifically for extending the range and performance of multiple wheel drive electric vehicles by recirculating recaptured electrical energy. In the present example, the power source/storage devices are coupled with the recapturing motor drives through multi-directional charging relay control circuitry. These types of configurations may include diode isolation techniques and/or current sharing devices for different performance requirements. Any and all current sharing devices may operate passively, actively but independently, and/or be controlled by master control circuitry. It should be apparent in light of the foregoing that many different parallel and serial applications using the present invention can be made, with many possible combinations of appropriate current sharing devices.

It should be noted that the present invention couples the electric motor within a switch-mode circuit, so that a significant amount of electrical energy can be recaptured from the electric motor during the "off" or inactive portion of the pulse width modulation duty cycle, thereby producing the recapturing motor drive.

In any switch-mode circuit, the duty cycle of the pulse width modulation control signal determines the length of "on-time" versus "off-time" for each clock cycle. Embodiments of the present invention will function properly over a wide range of duty cycles. The recapturing motor drives should be tuned to motor size and type to utilize the most efficient duty cycles and switching frequencies.

The recaptured electrical energy output can be used for a wide variety of supplemental electrical subsystems and supporting loads. As an example, the electrical energy output of a recapturing motor drive can drive active loads such as additional switch-mode circuitry. Such additional switch-mode circuitry can provide voltages and/or currents that are different from the electrical energy output of a recapturing motor drive. Such additional switch-mode circuitry can drive any predetermined load including the recapturing motor drives disclosed herein. It should be noted that such additional switch-mode circuitry must have a switching frequency that is higher than the switching frequency of the recapturing motor drive. Moreover, in order to make more efficient use of the "off" or inactive position of the duty cycle to recapture electrical energy from the electric motor, such switch-mode circuitry should have a switching frequency that is much higher than the switching frequency of the recapturing motor drive.

Once electrical energy is recaptured with the use of switch-mode circuitry, such recaptured electrical energy can be recirculated back through the recapturing motor drive. This is depicted in FIG. 6b where the total electric motor current is the sum of the power source current and the recirculating current from the output of the recapturing motor drive.

The recirculated electrical energy is measured at a summing node with a Y-network of precision $0.1'\Omega$ (Ohm) current sensing resistors that are matched to within 0.1% tolerance. (See FIG. 6b.)

The actual duty cycle and frequency will depend on the specific application of the present invention.

In general, an optimal range will be present in the duty cycle range of 30% to 50%. This provides an optimal range for producing both mechanical energy and recaptured electrical energy output.

At approximately a 50% duty cycle, a properly calibrated test set-up will show approximately 50% recaptured electrical energy output from the recapturing motor drive under medium load. This can result in recapturing and thereby saving about ½ of the electrical energy drawn from the power source.

At approximately a 30-35% duty cycle, a properly calibrated test set-up will show approximately 60% recaptured electrical energy output from the recapturing motor drive under heavy load. This can result in recapturing and thereby saving almost ⅔ of the electrical energy drawn from the power source.

This recaptured electrical energy savings combined with kinetic energy recovery systems such as a regenerative braking system can be especially useful in extending the potential range of electric vehicles to an unprecedented level. This combination will be especially effective and efficient in stop-and-go traffic and rolling hills because, at a 50% duty cycle, acceleration and climbing will use approximately 50% less electrical energy and regenerative braking will provide additional energy savings during deceleration and descending.

In effect, the recapturing motor drive can recapture potentially more than half of the electrical energy that flows through the electric motor, thereby reducing electrical energy consumption and the electrical energy drain on the power source by the same proportions. By recirculating the current back through the recapturing motor drive with complementary switch-mode circuitry, this extremely efficient recapturing motor drive system can extend both stored amp-hours and usable driving range.

It should be noted that the capacitor that comprises a component of the present invention is a storage capacitor that is used to receive and store electrical energy delivered from an electric motor and to provide such electrical energy to a load or loads, including, without limitation, switch-mode circuitry, the same recapturing motor drive, and/or additional recapturing motor drives.

It should be noted that the present invention may be complemented and/or supplemented by use of appropriate additional devices. Such devices include, by way of example and without limitation, the following: filters; over voltage protection circuitry; current sharing circuitry; current limiting circuitry; thermal regulation and/or thermal control systems; double-pole, double-throw switches coupled to reverse direction of an electric motor; and shielding to reduce electromagnetic interference from the switch-mode circuitry.

It should be noted that the disclosed techniques can be applied to any and all electric motor drive systems that operate by use of direct current or alternating current, including, by way of example and without limitation, any multiple-phase and/or alternating current electric motor drive systems.

It should be noted that the disclosed techniques can be applied to any and all types of electric motors, any and all electric motor drives, and any and all electric motor drive systems.

In the foregoing specifications, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A switch-mode electric motor drive circuit for providing mechanical energy and electrical energy, comprising:
    an electric motor;
    a switch;
    a diode;
    a storage capacitor for storing electrical energy delivered to said capacitor from said electric motor; and
    pulse width modulation control circuitry.

2. The switch-mode electric motor drive circuit for providing mechanical energy and electrical energy according to claim 1, further comprising:
    one or more electrical filters.

3. The switch-mode electric motor drive circuit for providing mechanical energy and electrical energy according to claim 1, further comprising:
    one or more over-voltage protection electrical circuits.

4. The switch-mode electric motor drive circuit for providing mechanical energy and electrical energy according to claim 1, further comprising:
    one or more current limiting electrical circuits.

5. The switch-mode electric motor drive circuit for providing mechanical energy and electrical energy according to claim 1, further comprising:
    one or more diodes for isolation in the distribution of electrical energy.

6. The switch-mode electric motor drive circuit for providing mechanical energy and electrical energy according to claim 1, further comprising:
    two or more motor coils within the electric motor, wherein two or more of said motor coils are coupled independently with a switch, a diode, a storage capacitor, and pulse width modulation control circuitry.

7. The switch-mode electric motor drive circuit for providing mechanical energy and electrical energy according to claim 1, further comprising:
    a regenerative braking system.

8. A switch-mode electric motor drive circuit for providing mechanical energy and electrical energy, comprising:
    one or more terminals for coupling with an electric motor;
    a switch;
    a diode;
    one or more terminals for coupling with a storage capacitor for storing electrical energy delivered to said capacitor from said electric motor; and
    pulse width modulation control circuitry.

9. The switch-mode electric motor drive circuit for providing mechanical energy and electrical energy according to claim 8, further comprising:
    one or more electrical filters.

10. The switch-mode electric motor drive circuit for providing mechanical energy and electrical energy according to claim 8, further comprising:
    one or more over-voltage protection electrical circuits.

11. The switch-mode electric motor drive circuit for providing mechanical energy and electrical energy according to claim 8, further comprising:
    one or more current limiting electrical circuits.

12. The switch-mode electric motor drive circuit for providing mechanical energy and electrical energy according to claim 8, further comprising:
one or more diodes for isolation in the distribution of electrical energy.

13. The switch-mode electric motor drive circuit for providing mechanical energy and electrical energy according to claim 8, further comprising:
two or more motor coils within the electric motor, wherein two or more of said motor coils are coupled independently with a switch, a diode, a storage capacitor, and pulse width modulation control circuitry.

14. The switch-mode electric motor drive circuit for providing mechanical energy and electrical energy according to claim 8, further comprising:
a regenerative braking system.

15. An electrical circuit for providing mechanical energy and electrical energy, comprising:
an electric motor;
a switch;
a diode;
a storage capacitor for storing electrical energy delivered to said storage capacitor from said electric motor;
pulse width modulation control circuitry;
two or more devices for storage and delivery of electrical energy; and
one or more additional switches, wherein said electric motor, said switch, said diode, said storage capacitor, and said pulse width modulation circuitry are coupled with said two or more devices for storage and delivery of electrical energy and with said one or more additional switches.

16. The electrical circuit for providing mechanical energy and electrical energy according to claim 15, further comprising:
one or more electrical filters.

17. The electrical circuit for providing mechanical energy and electrical energy according to claim 15, further comprising:
one or more over-voltage protection electrical circuits.

18. The electrical circuit for providing mechanical energy and electrical energy according to claim 15, further comprising:
one or more current limiting electrical circuits.

19. The electrical circuit for providing mechanical energy and electrical energy according to claim 15, further comprising:
one or more diodes for isolation in the distribution of electrical energy.

20. The electrical circuit for providing mechanical energy and electrical energy according to claim 15, further comprising:
two or more motor coils within the electric motor, wherein two or more of said motor coils are coupled independently with a switch, a diode, a storage capacitor, and pulse width modulation control circuitry.

21. The electrical circuit for providing mechanical energy and electrical energy according to claim 15, further comprising:
a regenerative braking system.

22. An electrical circuit for providing mechanical energy and electrical energy, comprising:
one or more electric motors;
one or more switches;
one or more diodes;
one or more storage capacitors for storing electrical energy delivered to said one or more capacitors from said one or more electric motors;
pulse width modulation control circuitry; and
one or more additional electric motors, wherein said one or more electric motors, said one or more switches, said one or more diodes, said one or more storage capacitors, and said pulse width modulation control circuitry are coupled with said one or more additional electric motors and wherein said electric motors are coupled in any configuration.

23. The electrical circuit for providing mechanical energy and electrical energy according to claim 22, further comprising:
one or more electrical filters.

24. The electrical circuit for providing mechanical energy and electrical energy according to claim 22, further comprising:
one or more over-voltage protection electrical circuits.

25. The electrical circuit for providing mechanical energy and electrical energy according to claim 22, further comprising:
one or more current limiting electrical circuits.

26. The electrical circuit for providing mechanical energy and electrical energy according to claim 22, further comprising:
one or more diodes for isolation in the distribution of electrical energy.

27. The electrical circuit for providing mechanical energy and electrical energy according to claim 22, further comprising:
two or more motor coils within the electric motor, wherein two or more of said motor coils are coupled independently with a switch, a diode, a storage capacitor, and pulse width modulation control circuitry.

28. The electrical circuit for providing mechanical energy and electrical energy according to claim 22, further comprising:
a regenerative braking system.

29. An electrical circuit for providing mechanical energy and electrical energy, comprising:
an electric motor;
a switch;
a diode;
a storage capacitor for storing electrical energy delivered to said capacitor from said electric motor;
pulse width modulation control circuitry; and
additional electrical switch-mode circuitry, wherein said electric motor, said switch, said diode, said storage capacitor, and said pulse width modulation control circuitry are coupled with the input of said additional electrical switch-mode circuitry.

30. The electrical circuit for providing mechanical energy and electrical energy according to claim 29, further comprising:
one or more electrical filters.

31. The electrical circuit for providing mechanical energy and electrical energy according to claim 29, further comprising:
one or more over-voltage protection electrical circuits.

32. The electrical circuit for providing mechanical energy and electrical energy according to claim 29, further comprising:
one or more current limiting electrical circuits.

33. The electrical circuit for providing mechanical energy and electrical energy according to claim 29, further comprising:

one or more diodes for isolation in the distribution of electrical energy.

34. The electrical circuit for providing mechanical energy and electrical energy according to claim 29, further comprising:
two or more motor coils within the electric motor, wherein two or more of said motor coils are coupled independently with a switch, a diode, a storage capacitor, and pulse width modulation control circuitry.

35. The electrical circuit for providing mechanical energy and electrical energy according to claim 29, further comprising:
a regenerative braking system.

36. An electrical circuit for providing mechanical energy and electrical energy, comprising:
an electric motor;
a switch;
a diode;
a storage capacitor for storing electrical energy delivered to said capacitor from said electric motor;
pulse width modulation control circuitry; and
additional electrical switch-mode circuitry, wherein said electric motor, said switch, said diode, said storage capacitor, and said pulse width modulation control circuitry are coupled with the input of said additional electrical switch-mode circuitry and wherein the output of said additional electrical switch-mode circuitry is coupled with the input of said electric motor.

37. The electrical circuit for providing mechanical energy and electrical energy according to claim 36, further comprising:
one or more electrical filters.

38. The electrical circuit for providing mechanical energy and electrical energy according to claim 36, further comprising:
one or more over-voltage protection electrical circuits.

39. The electrical circuit for providing mechanical energy and electrical energy according to claim 36, further comprising:
one or more current limiting electrical circuits.

40. The electrical circuit for providing mechanical energy and electrical energy according to claim 36, further comprising:
one or more diodes for isolation in the distribution of electrical energy.

41. The electrical circuit for providing mechanical energy and electrical energy according to claim 36, further comprising:
two or more motor coils within the electric motor, wherein two or more of said motor coils are coupled independently with a switch, a diode, a storage capacitor, and pulse width modulation control circuitry.

42. The electrical circuit for providing mechanical energy and electrical energy according to claim 36, further comprising:
a regenerative braking system.

43. An electrical circuit for providing mechanical energy and electrical energy, comprising:
one or more terminals for coupling with an electric motor;
a switch;
a diode;
one or more terminals for coupling with a storage capacitor for storing electrical energy delivered to said capacitor from said electric motor; and
pulse width modulation control circuitry, wherein said one or more terminals for coupling with said electric motor, said switch, said diode, said one or more terminals for coupling with said storage capacitor, and said pulse width modulation control circuitry are coupled with the input of additional electrical switch-mode circuitry and wherein the output of said additional electrical switch-mode circuitry is coupled with said one or more terminals for coupling with said electric motor, said switch, said diode, said one or more terminals for coupling with said storage capacitor, and said pulse width modulation control circuitry.

44. The electrical circuit for providing mechanical energy and electrical energy according to claim 43, further comprising:
one or more electrical filters.

45. The electrical circuit for providing mechanical energy and electrical energy according to claim 43, further comprising:
one or more over-voltage protection electrical circuits.

46. The electrical circuit for providing mechanical energy and electrical energy according to claim 43, further comprising:
one or more current limiting electrical circuits.

47. The electrical circuit for providing mechanical energy and electrical energy according to claim 43, further comprising:
one or more diodes for isolation in the distribution of electrical energy.

48. The electrical circuit for providing mechanical energy and electrical energy according to claim 43, further comprising:
two or more motor coils within the electric motor, wherein two or more of said motor coils are coupled independently with a switch, a diode, a storage capacitor, and pulse width modulation control circuitry.

49. The electrical circuit for providing mechanical energy and electrical energy according to claim 43, further comprising:
a regenerative braking system.

50. An electrical circuit for providing mechanical energy and electrical energy, comprising:
one or more electric motors;
one or more switches;
one or more diodes;
one or more storage capacitors for storing electrical energy delivered to said one or more storage capacitors from said one or more electric motors;
pulse width modulation control circuitry;
one or more additional electric motors; and
additional electrical switch-mode circuitry, wherein said one or more electric motors, said one or more switches, said one or more diodes, said one or more storage capacitors, and said pulse width modulation control circuitry are coupled with said one or more additional electric motors and wherein said additional electric motors are coupled in any configuration and wherein the input of said additional electrical switch-mode circuitry is coupled with one or more of said additional electric motors and wherein the output of said additional electrical switch-mode circuitry is coupled with the input of one or more of said electric motors.

51. The electrical circuit for providing mechanical energy and electrical energy according to claim 50, further comprising:
one or more electrical filters.

52. The electrical circuit for providing mechanical energy and electrical energy according to claim 50, further comprising:
one or more over-voltage protection electrical circuits.

53. The electrical circuit for providing mechanical energy and electrical energy according to claim 50, further comprising:
   one or more current limiting electrical circuits.

54. The electrical circuit for providing mechanical energy and electrical energy according to claim 50, further comprising:
   one or more diodes for isolation in the distribution of electrical energy.

55. The electrical circuit for providing mechanical energy and electrical energy according to claim 50, further comprising:
   two or more motor coils within the electric motor, wherein two or more of said motor coils are coupled independently with a switch, a diode, a storage capacitor, and pulse width modulation control circuitry.

56. The electrical circuit for providing mechanical energy and electrical energy according to claim 50, further comprising:
   a regenerative braking system.

57. A method for recapturing and utilizing electrical energy from an electric motor drive, comprising:
   coupling an electric motor within a switch-mode electric motor drive circuit comprising said electric motor, a switch, a diode, and a storage capacitor for storing electrical energy delivered to said capacitor from said electric motor;
   using said switch to control the flow of electrical energy through said electric motor at appropriate selected rates and frequencies using pulse width modulation control signals; and
   delivering electrical energy to said capacitor with the use of said diode.

58. The method of claim 57 further comprising:
   delivering said electrical energy from said capacitor alternately to two or more devices for storing electrical energy for future use by using multi-directional charging relay control switch circuitry; and
   storing for future use said electrical energy in said two or more devices for storing electrical energy for future use.

59. The method of claim 57 further comprising:
   delivering said electrical energy from said capacitor to an additional electric motor drive comprising an additional electric motor, an additional switch, an additional diode, and an additional capacitor for receiving electrical energy from said additional electric motor where said electrical energy being received from said additional electric motor is being received by said additional capacitor primarily for delivery to a load.

60. The method of claim 57 further comprising:
   delivering said electrical energy from said capacitor to a load.

61. The method of claim 57 further comprising:
   delivering said electrical energy from said capacitor to additional switch-mode circuitry; and
   delivering said electrical energy from said additional switch-mode circuitry to a load.

62. The method of claim 57 further comprising:
   delivering said electrical energy from said capacitor to additional switch-mode circuitry; and
   delivering said electrical energy from said additional switch-mode circuitry to said electric motor drive.

63. The method of claim 57 further comprising:
   delivering said electrical energy from said capacitor to an additional electric motor drive comprising an additional electric motor, an additional switch, an additional diode, and an additional capacitor for receiving electrical energy from said additional electric motor where said electrical energy being received from said additional electric motor is being received by said additional capacitor primarily for delivery to a load;
   delivering said electrical energy from said additional electric motor drive comprising said additional electric motor, said additional switch, said additional diode, and said additional capacitor to further additional switch-mode circuitry; and
   delivering said electrical energy from said further additional switch-mode circuitry to one of said electric motor drives.

\* \* \* \* \*